United States Patent
Sung et al.

(10) Patent No.: US 7,765,367 B2
(45) Date of Patent: Jul. 27, 2010

(54) CONTROL DEVICE FOR ACCELERATING MEMORY TO EXECUTE ITERANT COMMAND

(75) Inventors: Ming-Hsun Sung, Hsinchu (TW); Yu-Lin Hsieh, Tainan City (TW)

(73) Assignee: ITE Tech. Inc., Hsinchu (TW)

( * ) Notice: Subject to any disclaimer, the term of this patent is extended or adjusted under 35 U.S.C. 154(b) by 569 days.

(21) Appl. No.: 11/610,509

(22) Filed: Dec. 14, 2006

(65) Prior Publication Data

US 2008/0077751 A1 Mar. 27, 2008

(30) Foreign Application Priority Data

Sep. 26, 2006 (TW) .............................. 95135520 A

(51) Int. Cl.
*G06F 13/10* (2006.01)
(52) U.S. Cl. ...................................... 711/154; 711/156
(58) Field of Classification Search ................. 711/154, 711/156
See application file for complete search history.

(56) References Cited

U.S. PATENT DOCUMENTS 5,034,922 A * 7/1991 Burgess ................. 365/189.07
2003/0226063 A1* 12/2003 Bridge et al. ................. 714/42

* cited by examiner

*Primary Examiner*—Sanjiv Shah
*Assistant Examiner*—Jae U Yu
(74) *Attorney, Agent, or Firm*—Jianq Chyun IP Office

(57) ABSTRACT

The present invention provides a control device of the memory, which accelerates the memory to execute iterant commands. This control device includes a micro-controller unit, a controller, a block information table and a state machine. Among them, the micro-controller unit is used to issue a command to operate the memory, which contains several blocks. The controller is coupled between the memory and the micro-controller unit. When it determines the command needs not be executed repeatedly, the micro-controller unit would issue the command through the control device. When the command is determined necessary for repetitive execution, the state machine would repeatedly carry out this command. The state machine performs an analysis based on the state of every block in the block information table and executes repetitively the command accordingly. It also updates the state information on the blocks in the table accordingly.

5 Claims, 6 Drawing Sheets

CONTROL DEVICE FOR ACCELERATING MEMORY TO EXECUTE ITERANT COMMAND

CROSS-REFERENCE TO RELATED APPLICATION

This application claims the priority benefit of Taiwan application serial no. 95135520, filed on Sep. 26, 2006. All disclosure of the Taiwan application is incorporated herein by reference.

BACKGROUND OF THE INVENTION

1. Field of the Invention

This invention is related to a semiconductor memory, especially a control device that can accelerate the memory to execute iterant commands.

2. Description of Related Art

For normal semiconductor memories, the command to execute a certain task and its action are not complicated. Most control procedures issue similar commands to the different addresses of a memory, therefore, it is necessary to perform iterant actions in different addresses of the memory during a certain period of time. For example, erasing all the values in every address of all memories is to issue an erasing command in order to all the memory sections. Generally speaking, writing a firmware code and transmitting the command through the output port of a micro-controller Unit (MCU) can meet the requirement. However, during its action, the micro-controller unit cannot proceed with other tasks, which affects the overall efficacy.

SUMMARY OF THE INVENTION

The present invention provides a control device of memory that accelerates memory to execute iterant commands. The control device can ease the work load on the micro-controller unit and increase the efficacy of memory when it executes commands.

The present invention provides a control device of memory, which accelerates memory to execute iterant commands. This control device includes a micro-controller unit, a controller, a block information table and a state machine. Wherein, the micro-controller unit is used to issue a command to operate the memory, which contains several blocks. The controller is coupled between the memory and the micro-controller. When the controller determines the command needs not be executed repeatedly, the micro-controller would issue the command through the control device. While the command is determined necessary for repetitive execution, the state machine would repeatedly carry out this command. The block information table is used to record the state of every block. The state machine obtains the information on the state of every block from the block information table to analyze the state of a block so as to repeatedly execute the said command, and update the state information in the block information table.

By changing the device to issue a command from the micro-controller unit to the state machine when it is necessary to execute an iterant command in the memory, the iterant command can be carried out without involving the micro-controller unit and a software, so as to improve the efficacy of the memory and lower its power consumption.

In order to the make aforementioned and other objects, features and advantages of the present invention comprehensible, a preferred embodiment accompanied with figures are described in detail below.

DESCRIPTION OF EMBODIMENTS

Figure 1:
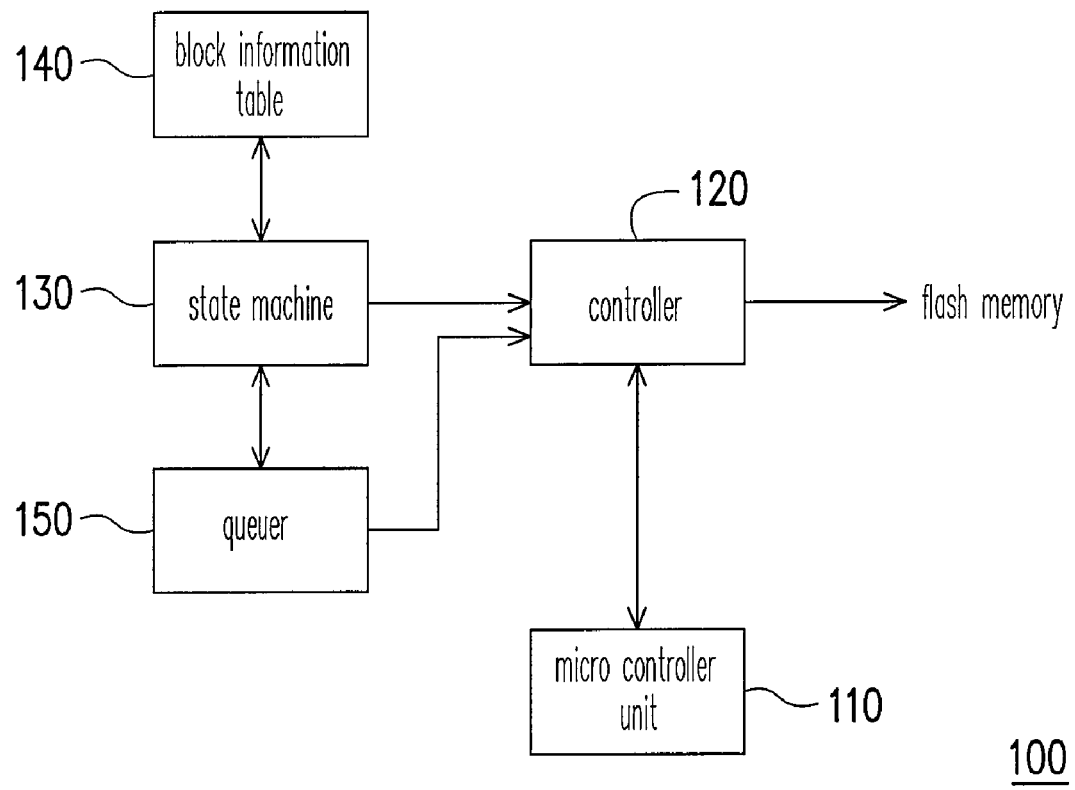
FIG. 1 is a block diagram of a control device of a memory according to one embodiment of the present invention.

FIG. 1 is a block diagram of the control device of the memory according to one embodiment of the invention. A flash memory among non-volatile memories is used in this embodiment as an example, and the flash memory contains several blocks. Referring FIG. 1, a control device 100 is used for accelerating the flash memory to execute iterant commands, which includes a Micro-controller Unit 110, a controller 120, a state machine 130, a block information table 140 and a queuer 150.

The micro-controller unit 110 issues a command to operate the memory. The said command can be a reading, writing, erasing command or a command to search for N empty blocks. N is a positive integer. The controller is coupled between the flash memory and the micro-controller unit 110. When it determines the command needs not be executed repeatedly, the micro-controller unit 110 would issue the command through the controller 120 to carry out the said command. On the contrary, when the command is determined necessary for repetitive execution, the state machine 130 would repeatedly carry out this command.

Besides, when the state machine 130 is carrying out the command repeatedly, it also needs the block information table 140 and the queuer 150. The block information table 140 is used to record the states of every block in the flash memory, while the queuer 150 is used to queue the addresses of the flash memory needed when the state machine 130 repeatedly executes the command. Hence, the state machine 130 obtains the states of each block in the flash memory through the block information table 140, analyzes these states and repeatedly executes the command in proper execution, and then updates the corresponding states in the block information table 140. The state machine 130 updates the corresponding state in the block information table 140 as a basis for restarting next time.

Figure 2:
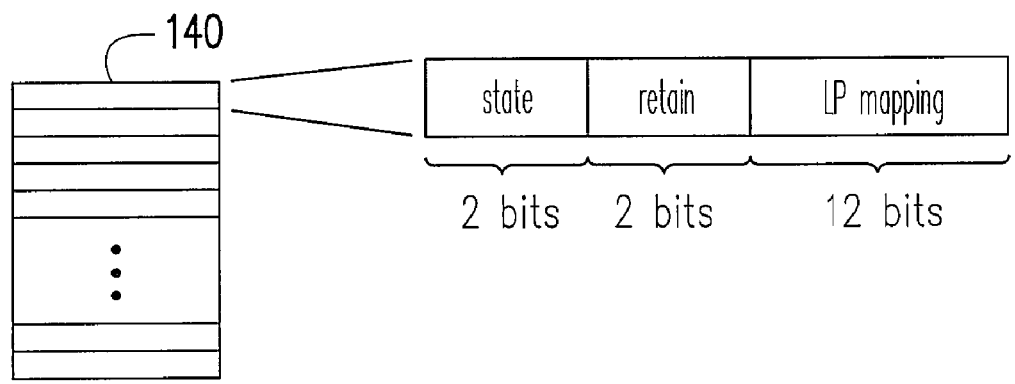
FIG. 2 is a structure diagram of a block information table according to one embodiment of the invention.

FIG. 2 is an information structure diagram of the block information table according to one embodiment of the invention. Referring FIG. 2, the block information table 140 of FIG. 2 includes several sub-blocks information corresponding to every block in the flash memory respectively. In one embodiment, the size of information of every block is 16 bits. The first column shown in two bits is used to record the state of the memory block, like three different states—empty, used and erasable. The second column is retained, not for ordinary use; it can be used to store the necessary information during expansion of other functions. The third column shown in 12 bits is used for LP mapping, i.e. the mapping relation from a logical address to a physical address.

Initially, the information in every sub-block in the block information table 140 is built up according to the contents of the redundant area in the corresponding block inside the flash memory, and stored in a partitioned area in a RAM. When the state machine 130 starts, it performs the corresponding execution according to an analysis result of the block states provided by the block information table 140 to carry out the command repeatedly, and the contents in the block information table 140 are updated by a software. The hardware will be based on the block state (the state values stored in the block state information table). Thus, when it is necessary to carry out the said command, the state machine 130 can be used to replace the micro-controller unit 110 to execute the command repetitively to significantly reduce the load on the micro-controller unit 110 and improve the efficacy of the whole flash memory. While it is not necessary to carry out the command, the state machine 130 enters an idle state to reduce its power consumption.

Figure 3:
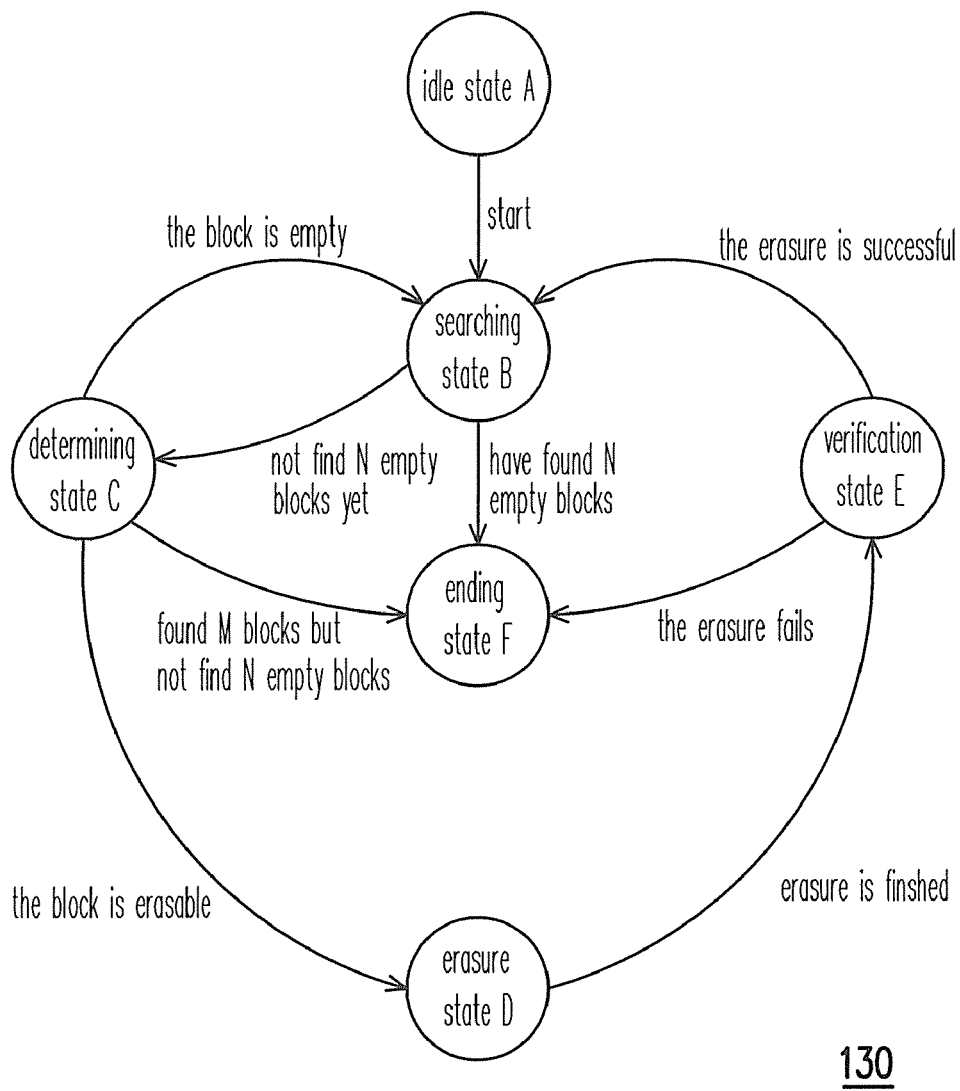
FIG. 3 is a state diagram of a state machine suitable for executing a command to search for several empty blocks according to one embodiment of the invention.

FIG. 3 is the state diagram of a state machine according to an embodiment of this present invention; the device is suitable for executing the command to search for N empty blocks, wherein, N is a positive integer. Referring FIG. 3, the state machine 130 shown in FIG. 1 includes an idle state A, a searching state B, a determining state D, an erasure state D, a verification state E and an ending state F. Wherein, the idle state A is the initial state of state machine 130. The searching state B searches for N empty blocks from the flash memory based on the block states in the flash memory recorded in Block Information Table 140. The determining state C is used to determine which blocks are empty or erasable. The erasure state D is used to erase the contents in the blocks. The verification state E is to verify whether or not the erasure of blocks is successfully completed. The ending state F is used to stop executing the command repetitively.

When the state machine 130 begins to receive signals, it means the command has to be executed repeatedly; hence, the state machine 130 enters the searching state B from the idle state A. Once the state machine 130 finds N empty blocks in the flash memory during the searching state B, it would enter the ending state F and stop repeatedly executing the command; oppositely, when the N empty blocks are not yet found, the state machine 130 would enter the determining state C.

The state machine 130 determines the present blocks are empty or erasable according to the information in the state column of the sub-blocks during the determining state C. If the block is empty, its address will be recorded in the queuer 150, and the state machine 130 will return to the searching state B to continue searching for the next empty block. If the block is erasable, the state machine 130 enters the erasure state D to erase it so that an erasure command can be directly issued from the hardware; there is no need to issue from the software. In addition, the state machine 130 enters the ending state F from the determining state C to stop executing the command repetitively, when the queuer 150 does not have enough space to queue addresses, or the number of times to repeat a command exceeds a preset number M, i.e. searching in M blocks without finding N empty blocks, wherein M is a positive integer larger than N.

When the contents in the blocks are erased, the state machine 130 enters the verification state E from the erasure State D to verify whether or not the erasure of blocks is successful. If so, the state machine 130 would return to the searching state B to look for the next empty block. If not, the state machine 130 would enter the ending state F to stop executing the command repeatedly. Lastly, the command of iterant execution is stopped during the ending state F, and the state is reported to the system. So in this embodiment, the state machine 130 can find the empty blocks in the flash memory that are still usable. If the number of usable empty blocks reaches the needed number, the state machine 130 would automatically stop in order to avoid wasting efficacy of the system and reduce power consumption. In addition, that no software is needed during the execution can also lower the load on the micro-controller unit 110.

Figure 4:
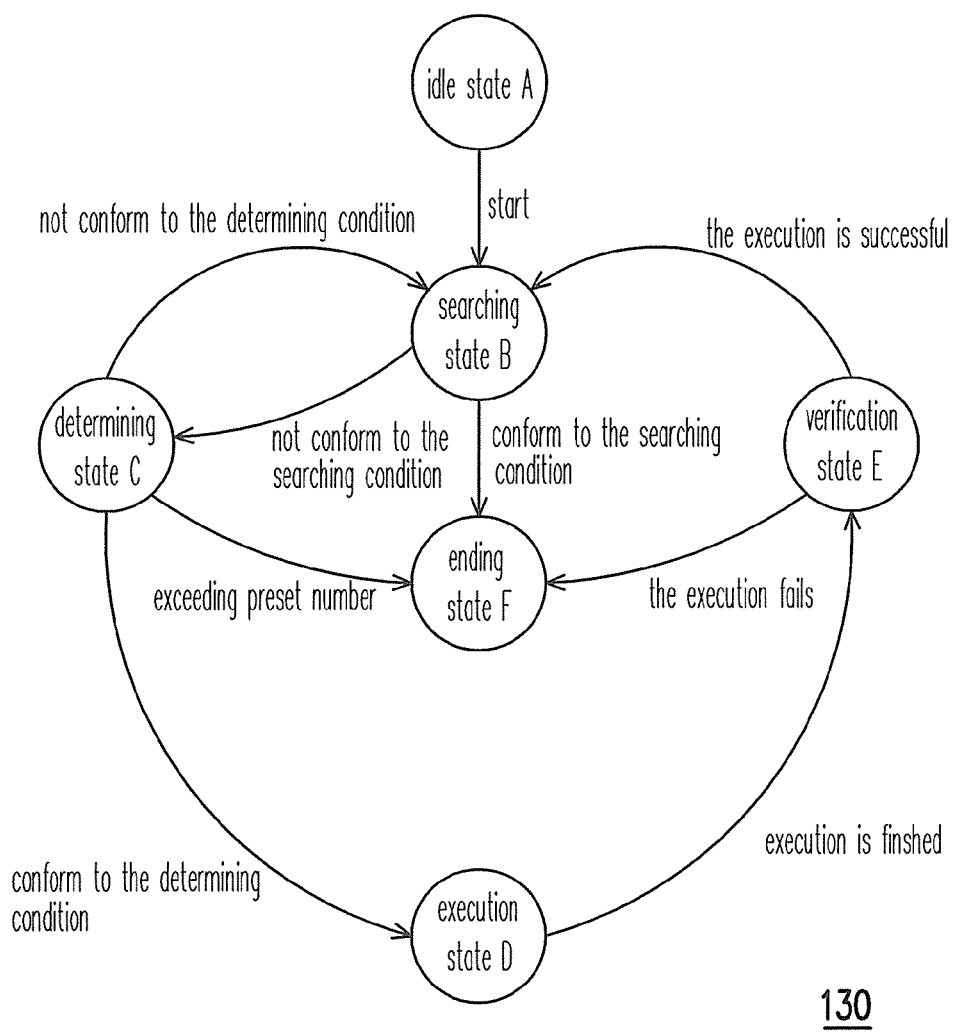
FIG. 4 is a state diagram of a state machine according to one embodiment of the invention.

FIG. 4 is a state diagram of a state machine according to another embodiment of this present invention. The device is suitable for iterant execution, such as erasure, writing-in, reading etc. Referring FIG. 4, the state machine awaits a firmware to issue a command in the idle state A, and then enters the searching state B. When the condition of the searching is met, the state machine would enter the ending State F and report to the system. Oppositely, if the condition is failed, the state machine would enter the determining state C. In this embodiment, the condition of the searching refers to that of ending this state machine. For example, if the state machine is set to erase 10 memory blocks, then the condition of the searching is 10 memory blocks.

During the searching State B, if the state of the memory conforms to the condition, the state machine would enter the execution state D. On the contrary, if the state of the memory does not conform to the condition, then the state machine would return to the searching state B. Taking erasure for an example, if the state of the memory is labeled as erasable, the state machine would execute erasing it. If it is labeled as inerasable, the state machine would return to the searching state B.

When the execution of state D is completed, the state machine enters the verification state E. If the execution is carried out successfully, the state machine would return to the searching state B to continue carrying out the foregoing executions at the next address of the memory. Oppositely, if the execution fails, the state machine would return to the ending state F, and report to the system. Disclosed as follows is an example of a state machine during its executions of reading, writing-in and erasing.

Figure 5:
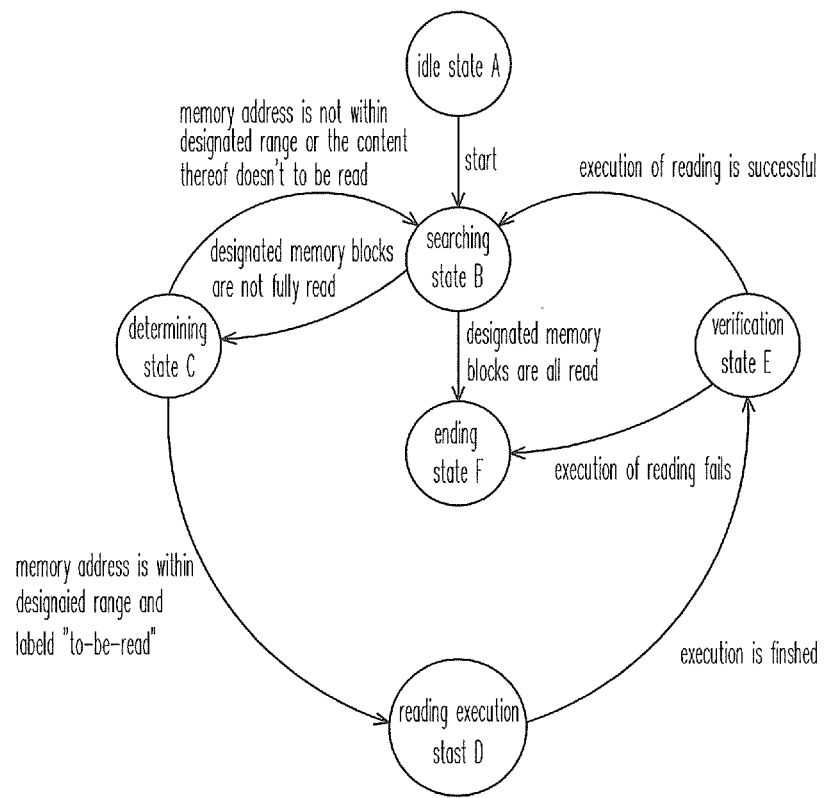
FIG. 5 is a state diagram of a state machine during its execution of reading according to one preferred embodiment of the invention.

FIG. 5 is a state diagram of a state machine during its execution of reading according to one preferred embodiment of the invention. Referring FIGS. 1 and 5, if a wished execution is reading at a certain memory address in a certain memory block, first, marking the state corresponding to the targeted memory address as "to-be-read" through the firmware. When the state machine 130 is started, the state machine would enter the searching state B from the idle state A. When the designated memory blocks are not yet fully read, the state machine 130 would enter the determining state C. In the determining state C, the memory address and its state indicator are checked. Oppositely, when the designated memory blocks are all read, the state machine 130 would directly enter the ending state F.

If the memory address is not within the memory block to be read, or its state indicator labels "not-to-be-read", the state machine 130 would return to the searching state B, or re-check the next memory address and its state indicator. To the contrary, if the memory address is within the designated memory block and labeled as "to-be-read", the state machine 130 would return to a reading execution state D. At this moment, the controller 120 is controlled to issue a reading command to the flash memory and returns to the verification state E when the controller 120 finishes performing the execution.

If the execution of reading the memory is successfully executed, the state machine 130 would return to the searching State B so as to continue repeating the above steps on the next memory address. Oppositely, if the execution of reading of the memory fails, the state machine would return to the ending state F, and report the state to the system. Therefore, in this embodiment, the state machine 130 can find the contents of a designated block within the flash memory and the system would automatically stop after the searching within the designated block is over. So that, the state machine 130 can share the load on the micro-controller unit 110.

Figure 6:
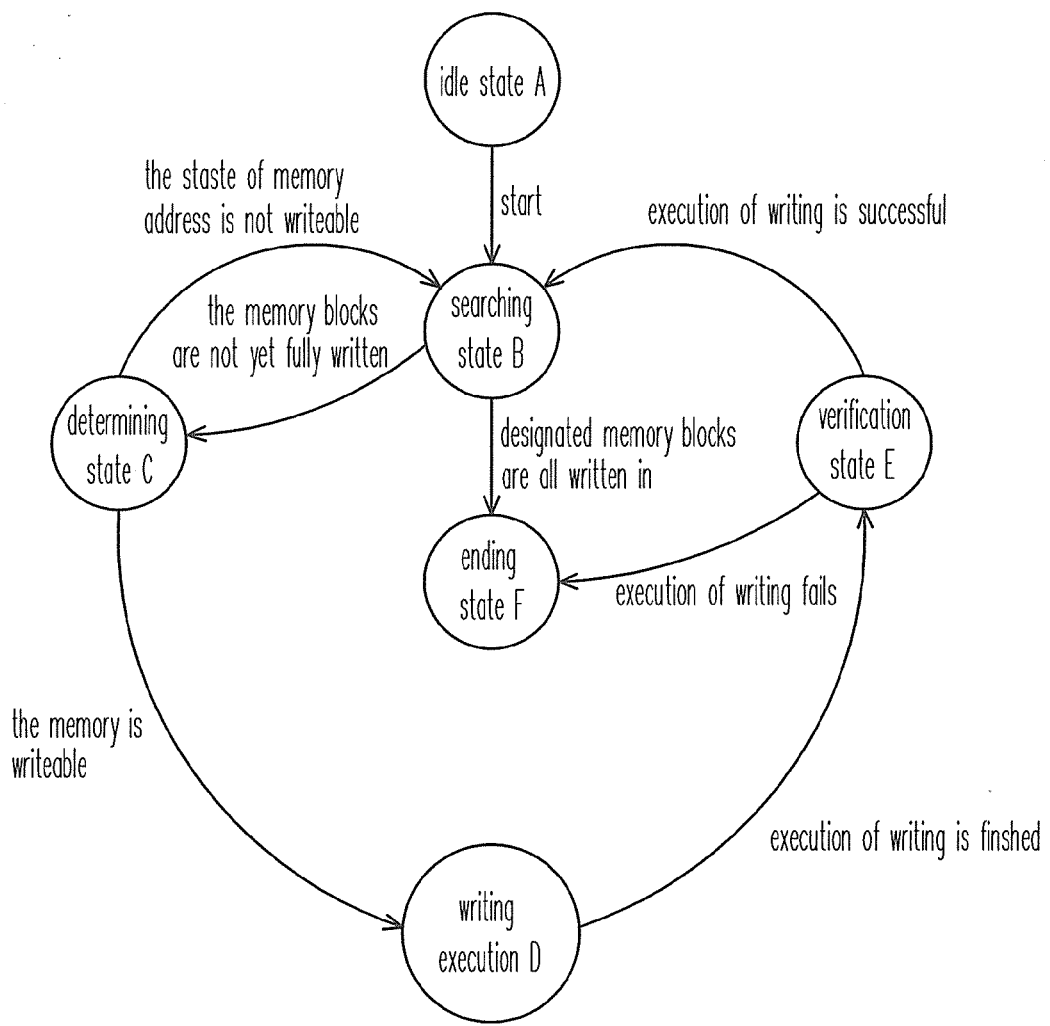
FIG. 6 is a state diagram of a state machine during its execution of writing according to one preferred embodiment of the invention.

FIG. 6 is a state diagram of a state machine during its execution of writing according to one preferred embodiment of the invention. Referring FIGS. 1 and 6. If the desired execution is writing in a certain block in the memory, first, designating the desired address of the memory through a firmware for writing. When the state machine 130 is started, it would enter the searching state B from the idle state A. When the physical memory blocks are not yet fully written, the state machine 130 would enter the determining state C to check the memory address and its state indicator. Oppositely, when the designated memory blocks are all written, the state machine 130 would directly enter the ending state F.

While in the determining state C, if the memory address is not within the memory block to be written, or its state indicator labels "not-to-be-written", the state machine 130 would return to the searching state B, or re-check the next memory address and its state indicator. Contrarily, if the memory address is within the designated memory block and labeled as "to-be-written", the state machine 130 would return to a writing execution state D. At this moment, the system would issue a writing command to the flash memory through the controller 120, and enter the verification state E after performance of the controller 120.

If the execution for writing in the memory is successful, the state machine 130 would return to the searching state B so as to continue repeating the above steps on the next memory address. Oppositely, if the execution for writing in the memory fails, the state machine 130 would return to the ending state F, and report the state to the system. Hence, in this embodiment, the state machine 130 can execute iterant writing on the designated blocks according to the state indicator.

Figure 7:
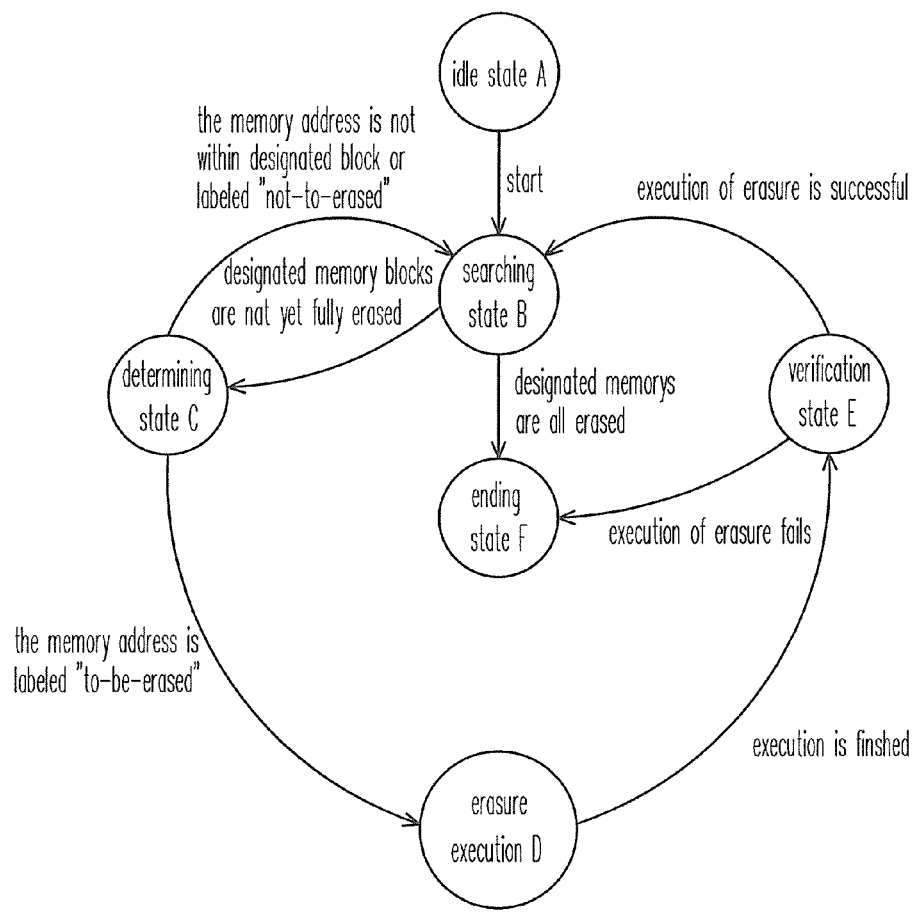
FIG. 7 is a state diagram of a state machine during its execution of erasing according to one preferred embodiment of the invention.

FIG. 7 is a state diagram of a state machine during its execution of erasing according to one preferred embodiment of the invention. Referring FIGS. 1 and 7, if the desired execution is iterant erasure, first, labeling the state of the physical address of the to-be-erased memory as erasable in block information table 140 through a firmware. After the state machine 130 is started, it would enter the searching state B. If all the designated blocks are not yet fully erased, the state machine 130 would enter the determining the determining state C. Oppositely, when the designated memory blocks are all erased, the state machine 130 would directly enter the ending state F.

If the state of said address is labeled "not-to-be-erased" or the memory address is not within the designated block, the state machine 130 would return to the searching state B to re-check the next memory address and its state indicator. Oppositely, if the address is within the designated block, and its state is labeled "erasable", the state machine 130 would enter anthe erasure execution state D. At this moment, the controller 120 is controlled to issue an erasing command to the memory and returns to the verification state E when the controller 120 finishes performing the execution.

If the execution of erasure is successful, the state machine 130 would return to the state B and repeat the above steps on the next memory address. Oppositely, if the execution of erasure fails, the state machine 130 would return to the ending state F, and report it to the system.

By changing the device to issue a command to the state machine from the micro-controller unit when it is necessary to execute an iterant command in the memory, the iterant command can be carried out without involving the micro-controller unit and software, so as to improve the efficacy of the memory and lower its power consumption.

Although the present invention has been disclosed above by the preferred embodiments, they are not intended to limit the present invention. Anybody skilled in the art can make some modifications and alteration without departing from the spirit and scope of the present invention. Therefore, the protecting range of the present invention falls in the appended claims.

What is claimed is:

1. A control device of a memory, used for accelerating the execution of an iterant command in the memory, the memory comprising a plurality of blocks, the control device comprising:

a micro-controller unit, used for issuing a command to operate the memory;

a block information table, used for recording states of the blocks;

a state machine for obtaining the state information of every block from the block information table and for analyzing the state of every block to repeatedly execute the command, and to update the state information in the block information table; and a controller, coupled between the memory and the micro-controller, wherein when the command is determined to be not executed repeatedly, the command is executed by the micro-controller unit through the control device, and when the command is determined to be executed repeatedly, the command is carried out by the state machine repeatedly, wherein the command comprises reading, writing, erasing or searching for N empty blocks, and N is a positive integer, wherein when the command is executed by the state machine to search for N empty blocks, the state machine further comprises:

an idle state, which is the initial state of the state machine;

a searching state, used to search for N empty blocks from the memory according to the state record of every block in the block information table;

a determining state, used to determine which blocks are empty or erasable;

an erasure state, used to erase the contents in the blocks;

a verification state, used to verify if the erasure of blocks is successfully completed; and an ending state, used to stop executing the command repetitively, wherein, when the state machine receives a starting signal to execute repeatedly the command, the state machine enters the searching state from the idle state; during the searching state if N empty blocks are found in the memory, the state machine enters the ending state; if N empty blocks are not found in the memory, the state machine enters the determining state; when the determining state determines the present block is empty, the state machine returns to the determining state; when the determining state determines the present block is erasable, the state machine enters the erasure state; after the erasure state erases the contents of the block, the state machine enters the verification state; and when the verification verifies the erasure of the block successful, the state machine returns to the searching state.

2. The control device as claimed in claim 1, further comprising a queuer for queuing a plurality of addresses of the state machine needed for iterant execution of the command.

3. The control device as claimed in claim 1, wherein the memory includes a non-volatile memory.

4. The control device as claimed in claim 1, wherein the determining state determines that after searching M blocks but not finding N empty blocks, the state machine enters the ending state, and M being a positive integer larger than N.

5. The control device as claimed in claim 1, wherein when the verification state verifies the failure of the erasure, the state machine enters the ending state.

* * * * *